US006918180B2

(12) United States Patent
Koda et al.

(10) Patent No.: US 6,918,180 B2
(45) Date of Patent: Jul. 19, 2005

(54) METHOD OF MANUFACTURING INK JET HEAD

(75) Inventors: Tomohiko Koda, Hitachinaka (JP); Kunihiro Tamahashi, Hitachinaka (JP); Jun Nagata, Hitachinaka (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 596 days.

(21) Appl. No.: 10/015,645

(22) Filed: Dec. 17, 2001

(65) Prior Publication Data

US 2002/0073543 A1 Jun. 20, 2002

(30) Foreign Application Priority Data

Dec. 15, 2000 (JP) .................................... P2000-381328

(51) Int. Cl.7 .......................... B23D 53/76; B23P 17/00

(52) U.S. Cl. ..................... 29/890.1; 29/25.35; 156/290; 156/292; 347/68; 347/70; 347/71

(58) Field of Search .......................... 29/25.35, 890.12; 347/58–71; 156/290, 292

(56) References Cited

U.S. PATENT DOCUMENTS 5,144,342 A * 9/1992 Kubota ........................ 347/70
5,900,215 A * 5/1999 Seifert et al. ............ 422/82.07
6,280,022 B1 * 8/2001 Reinten ....................... 347/70

FOREIGN PATENT DOCUMENTS

JP 11198582 A * 7/1999 ............ B43K/7/02

OTHER PUBLICATIONS

"A new device for multifunctional dosage of liquids by a free jet"; Hey, N.; Freygang, M.; Gruhler, H.; Sandmaier, H.; Zengerle, R.; Micro Electro Mechanical Systems, 1998. MEMS 98. on , Jan. 25–29, 1998; pp.: 429–431.*

* cited by examiner

*Primary Examiner*—Paul D Kim
(74) *Attorney, Agent, or Firm*—Whitham, Curtis & Christofferson, P.C.

(57) ABSTRACT

To adhere an actuator unit onto one surface of a diaphragm, a dipping plate is used to evenly cling an adhesive agent to tip ends of a plurality of actuators formed in the actuator unit. The dipping plate is formed with a plurality of grooves corresponding to the respective ones of the plurality of actuators. An adhesive agent is poured into the grooves to the same level and the actuators are dipped into the adhesive pond while maintaining a state in which an imaginary first line that connects the tip ends of said plurality of actuators is in parallel with an imaginary second line that connects borders between immersed and non-immersed portions of the plurality of actuators. The actuators are drawn from the adhesive ponds and adhered to one surface of the diaphragm. An ink channel unit is connected to the opposite surface of the diagram.

7 Claims, 5 Drawing Sheets

METHOD OF MANUFACTURING INK JET HEAD

BACKGROUND OF THE INVENTION

1. Field of the Invention

The present invention relates to a method of manufacturing ink jet heads.

2. Description of the Related Art

An ink jet head with a basic structure includes an actuator that extends in its longitudinal direction when applied with an electrical signal, and a diaphragm attached to one end of the actuator and defining an ink chamber filled with ink. When the actuator extends in its longitudinal direction, the actuator deforms diaphragm into the ink chamber, thereby pressurizing the ink in the ink chamber. This ejects an ink droplet from a nozzle formed in a nozzle plate opposite the diaphragm. An ink jet head of multi-nozzle structure is formed with a plurality of single-nozzle units with their nozzles aligned.

Techniques such as super fine machining and super precise intimate contacting and bonding are introduced into manufacturing methods of the heads to manufacture the heads in a compact size and with a high-density nozzle arrangement. It is important that each nozzle in the head is capable of ejecting ink droplets having the same weight and at the same speed. To this end, the dimension or each nozzle unit and the thickness of the bonding layer used in assembling the nozzle unit must be as uniform as possible to minimize the variation in weight and in ejecting speed of ink droplets.

The bonding technique used for bonding the actuator and the diaphragm is particularly important, because bonding variation is closely correlated with the speed of ink droplets and the amount of ink ejected from the nozzle. Specifically, initial pressure imparted on the diaphragm will vary depending on the thickness of the bonding layer. Accordingly, the stress on the diaphragm, and consequently the deform amount of the diaphragm, will also vary depending on variation in the thickness of the bonding layer. Even if actuators attached to different diaphragms are displaced by the same amounts the same ink droplet ejection capability will not be attained if there is variation in the deform amount of the diaphragms.

Small size heads with high density nozzle arrangements include a greater number of smaller size actuators. Therefore, not only does the end face of the actuator where adhesive agent is coated have a small area, but the number of bonding portions also increases. This makes it difficult to have the same bonding thickness in all the bonding portions within the head. Furthermore, because adjacent actuators are separated by only a vary short distance, the adhesive agent is likely to bridge over and connect the two adjacent actuators during the bonding process. Once the adhesive agent connects the two adjacent actuators, the behavior of one actuator will be transmitted to the other actuator, resulting in interference between the actuators, so the ink ejection performance is degraded.

SUMMARY OF THE INVENTION

The present invention has been made to solve the aforementioned problems, and accordingly it is an object of the invention to provide a manufacturing method of an ink jet head, wherein adhesion of an actuator unit to a diaphragm can be attained easily with high accuracy. Another object of the invention is to provide a manufacturing method of an ink jet head applicable to manufacturing of an ink jet head with high density nozzles.

An ink jet head manufactured according to the invention includes an actuator unit, a diaphragm, and an ink channel unit. The actuator unit is formed with a plurality of actuators extending in the same direction from a base portion to be in parallel with one another. Each actuator may either be a $d_{33}$ type piezoelectric actuator in which a plurality of piezoelectric elements are stacked in a longitudinal direction or a $d_{31}$ type piezoelectric actuator in which a plurality of piezoelectric elements are stacked in a direction perpendicular to the longitudinal direction. Both types of actuators are extendable in the longitudinal direction causing tip ends of the actuators to move away from the base portion when applied with an electrical signal. The actuator unit is adhered to one surface or the diaphragm, and the ink channel unit is connected to another surface of the diaphragm. The ink channel unit is formed with a plurality of ink channels corresponding to respective ones of the plurality of actuators individually.

According to the invention, the tip ends of the plurality of actuators are dipped into an adhesive pond so that an adhesive agent clings to the tip ends of the plurality of actuators while maintaining a state in which an imaginary first line that connects the tip ends or the plurality of actuators is in parallel with an imaginary second line that connects borders between immersed and non-immersed portions of the plurality of actuator.

The actuator unit is adhered onto one surface of the diaphragm while abutting the tip ends of the plurality of actuators thereagainst. Then, the ink channel unit is connected to another surface of the diaphragm so that the plurality of ink channels are positioned in confronting relation with the respective ones of the plurality of actuators individually.

It is preferable that the actuator unit be further formed with at least two positioning members defining reference positions. The positioning members extend from the base portion to be in parallel with the plurality of actuators, and the plurality of actuators are interposed between the positioning members. When dipping the tip ends of the plurality of actuators into the adhesive pond, the imaginary second line is brought to be substantially in coincidence with an imaginary third line that connects the reference positions.

Each of the plurality of actuators have an inactive portion at its tip end. The inactive portion is non-responsive to the electrical signal. When dipping the tip ends of the plurality of actuators into the adhesive pond, it is preferable that the imaginary second line be brought to be within the inactive portion.

In dipping the tip ends of the plurality of actuators into the adhesive pond, it is preferable to use a dipping plate formed with a plurality of grooves corresponding to respective ones of the plurality of actuators. A plurality of adhesive ponds are formed in the plurality of grooves by pouring an adhesive agent. The adhesive agent in poured to the same level in all the grooves. The tip ends or the plurality of actuators are dipped into corresponding adhesive ponds, and drawing the tip ends from the corresponding adhesive ponds.

As such, variation in thickness of the adhesive agent coated on the actuators is reduced and the area on which the adhesive agent is coated is restricted.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Preferred embodiments of the present invention will be described while referring to the accompanying drawings.

Figure 1:
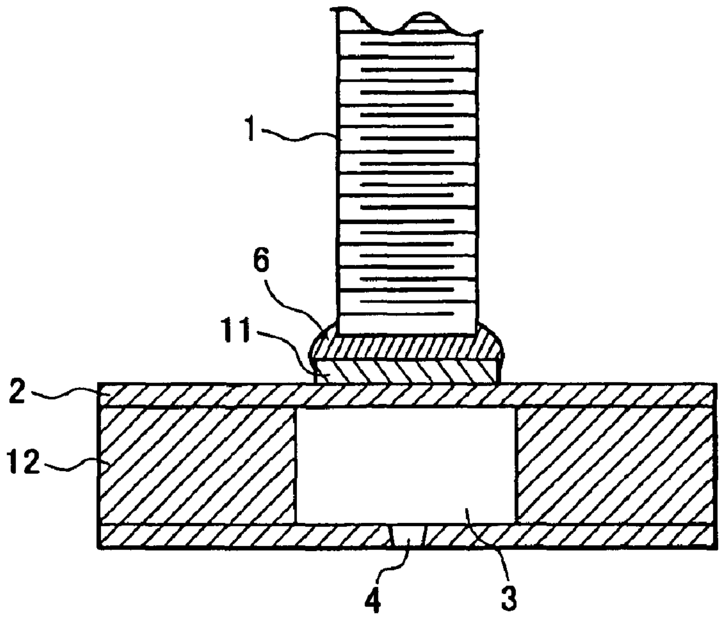
FIG. 1 is a cross-sectional side view showing an ink jet head according to a preferred embodiment of the invention.
Figure 2:
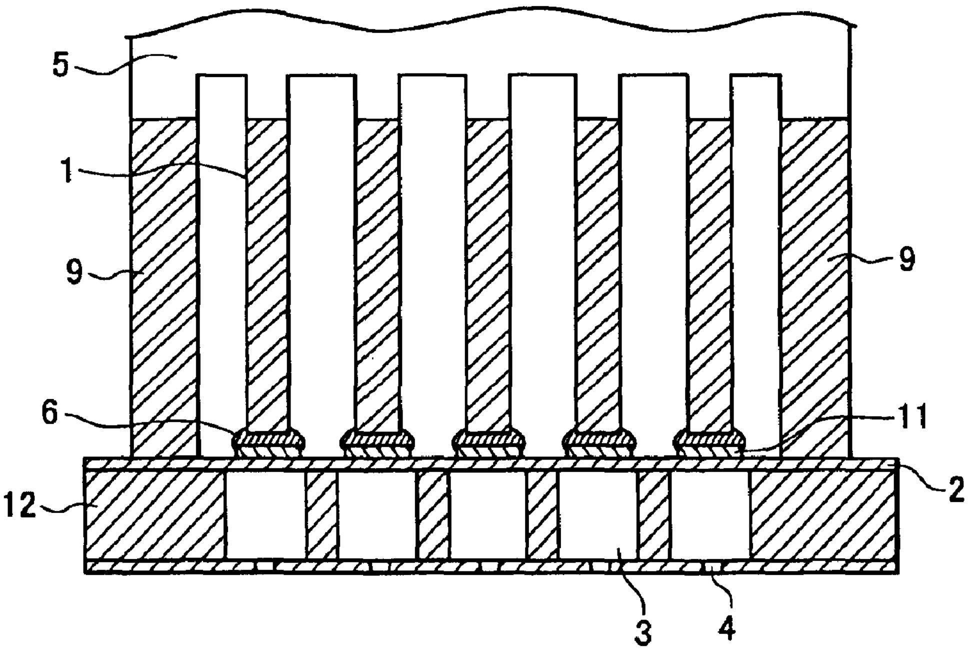
FIG. 2 is a cross-sectional plan view showing the ink jet head in FIG. 1.
Figure 3:
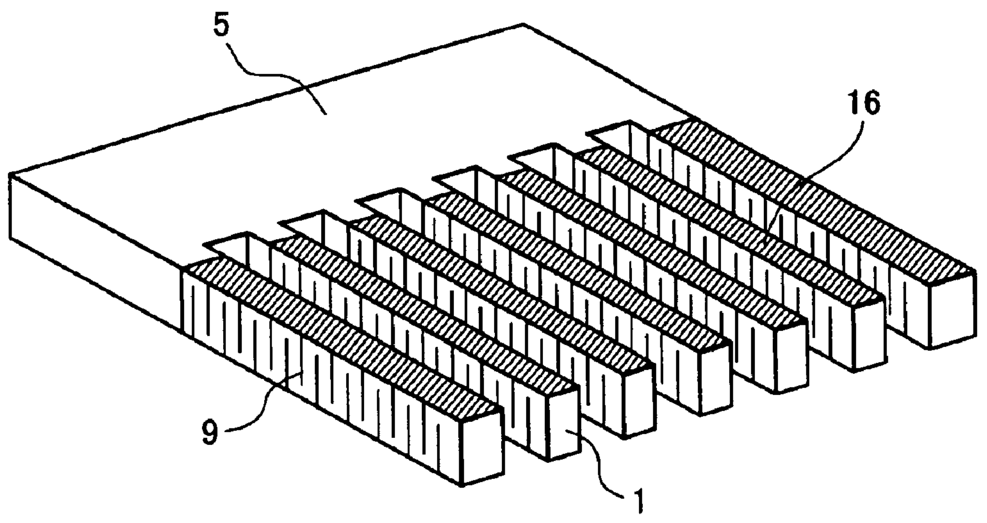
FIG. 3 is a perspective view showing an actuator unit used in the ink jet head in FIG. 1.

FIG. 1 is a vertical cross-sectional side view of an ink jet head manufactured according to a preferred embodiment of the invention. FIG. 2 is a vertical cross-sectional front view of the ink jet head shown in FIG. 1. FIG. 3 is a perspective view of an actuator unit used in the ink jet head shown in FIGS. 1 and 2.

As shown in FIGS. 1 and 2, the ink jet head includes an actuator unit 5, a diaphragm 2, and an ink channel unit 12. The actuator unit 5 has a comb shaped as shown in FIG. 3 and is adhered to one side of the diaphragm 2. The ink channel unit 12 is disposed at the other side of the diaphragm 2.

The comb-shaped actuator unit 5 is made up of a base portion and teeth portion. In the teeth portion, a plurality of actuators 1 (five in the drawing) and two dummy actuators 9 extend from the base portion and are juxtaposed at a fixed interval of 1/75 of an inch. The actuators 1 are interposed between the two dummy actuators 9.

Tho actuators 1 are adhered to one surface of the diaphragm 2 and the ink channel unit 12 is attached to the other surface of the diaphragm 2 so that the pressuring chambers 3 of the ink channel unit 12 are disposed to confront the respective ones of the actuators 1 with the diaphragm 2 interposed therebetween. Each actuator 1 has a rectangular parallelepiped shape formed by stacking a number of piezoelectric elements and internal electrodes alternately in the longitudinal direction of the actuator 1. A half of the internal electrodes in each actuator 1 are collectively connected to an external common electrode 16 provided at the top surface of each actuator 1 as shown in FIG. 3. Each actuator 1 extends in the longitudinal direction when applied with an electric signal.

The piezoelectric element at the tip end of the actuator 1 is not formed with an electrode on its outer side and so does not extend when a voltage is applied to the actuator 1. The tip-end element simply transfers accumulated displacement of the remaining piezoelectric elements to the diaphragm 2 and will be hereinafter referred to as "inactive piezoelectric element" accordingly.

Figure 4:
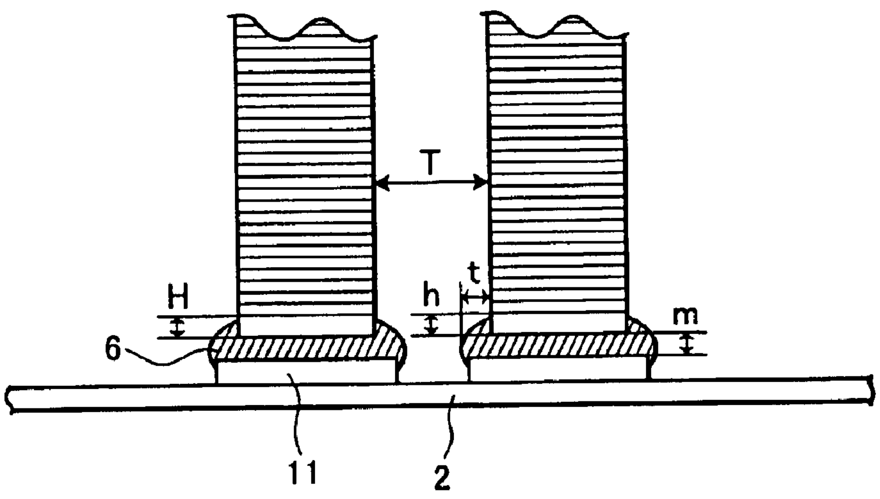
FIG. 4 is a cross-sectional plan view showing a bonding condition of the actuator unit and a diaphragm.

No electrical signals are applied to the dummy actuators 9 disposed at the outermost sides of the actuators 1 and so the dummy actuators 9 do not extend. Rather the dummy actuators 9 are used for positioning purposes when adhering the actuators 1 to the diaphragm 2. That is, as best shown in FIG. 4, the actuators 1 are adhered with an adhesive agent 6 to projected portions 11, which are fixed to the diaphragm 2. The projected portions 11 have a rectangular surface to which the and face of the actuators 1 are adhered. The diaphragm 2 and the ink channel unit 12 define pressurizing chambers 3. The dummy actuators 9 have a length that is longer than the length of the actuators 1 by a sum of thickness of the adhesive agent layer and the thickness of the stand 11. The end faces of the dummy actuators 9 are flat and parallel to the end faces of the actuators 1.

The ink channel unit 12 has a nozzle plate 14 in which a plurality of nozzles 4 are formed for ejecting ink droplets therefrom. The nozzles 4 are formed in a one-to-one correspondence with the pressurizing chambers 3 and the actuators 1. Therefore, the pitch of the nozzles 4 is equal to that of the actuators 1. No pressurizing chambers are provided in correspondence with the dummy actuators 9.

FIG. 4 shows an adhered condition of the actuators 1 to the diaphragm 2. After adhesion, the adhesive agent protrudes horizontally outward by an amount t and vertically outward by an amount h. Two adjacent actuators are separated by a distance T. The relation of $t<T/2$ must be met in order to avoid contact between adhesive of the two actuators. Further, the inactive piezoeleoctric element at the tip end of the actuator 1 has a thickness H. The relation of $h<H$ must be met in order to avoid influence exerted over the displacement action of the actuator 1 by the adhesive agent layer 6. The thickness m of the hardened adhesive agent layer 6 must be thinner than a reference value M, which must be greater than the surface roughness of the tip faces of the actuators 1 and the projected portions 11 but not so great as to degrade ejection performance.

Figure 5:
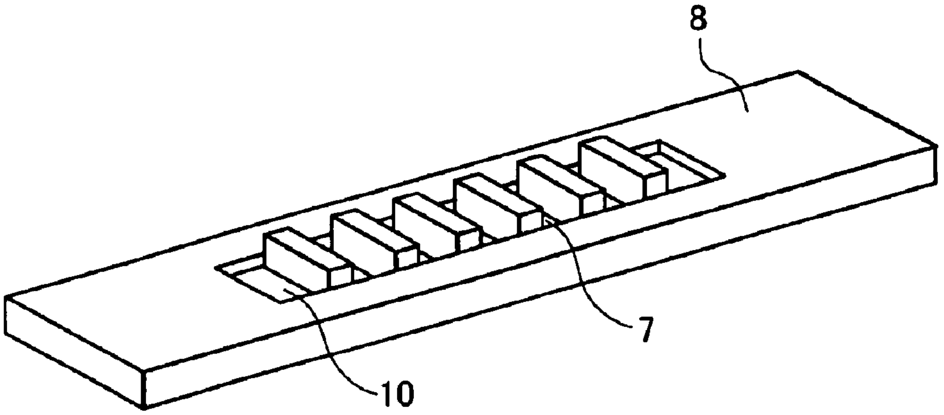
FIG. 5 is a perspective view showing a dipping plate used in a manufacturing method according to the invention.
Figure 6:
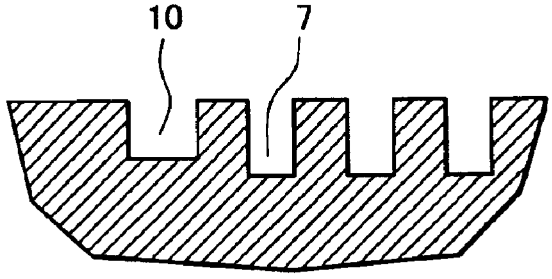
FIG. 6 is a cross-sectional plan view showing the dipping plate in FIG. 5.

Next, an adhesive agent coating method will be described while referring to FIGS. 5 and 6. FIG. 5 is a perspective view of a dipping plate 8. FIG. 6 is a partially cut-away cross-sectional view of the dipping plate 8 shown in FIG. 5. The dipping plate 8 is used for setting the amount of adhesive agent to be coated on the tip end portions of the actuators 1. As shown in FIGS. 5 and 6, the dipping plate 8 is formed with grooves 7 and 10 corresponding to the actuators 1 and dummy actuators 9, respectively. The grooves 10 for the dummy actuators 9 are shallower than the grooves 7 for the actuators 1. The shape and depth of the grooves 7 are determined depending on the configuration of the inactive piezoelectric element at the tip end of the actuators 1 and also on the material components of the adhesive agent. Similarly, the shape and depth of the grooves 10 are determined depending on the configuration of the tip end portions of the dummy actuators 9. The grooves 7 have such a size that when the actuators 1 are brought into engagement with the grooves 7, the actuators 1 are not in contact with inner walls of the grooves 7.

Such a dipping plate 8 is made by pressing two flat plates against each other while sandwiching a plate formed with comb-teeth portions therebetween. The comb-teeth plate is made according to a wire machining. The dipping plate 8 thus made is then subjected to repellency treatment so that the adhesive agent poured into the grooves 7 and thereafter hardened can be easily peeled off.

To coat the adhesive agent on the tip end portions of the actuators 1, an adhesive agent is poured into the grooves 7 to form adhesive ponds. The grooves 10 for the dummy actuators 9 remain empty. Then, the tip end portions of the actuators 1 are immersed into the adhesive ponds until the dummy actuators 9 are brought into abutment with the bottom portions of the grooves 10. As such, the depth of the grooves 10 determines the area where the adhesive agent is coated on the tip end portions of the actuators 1 and also the amount of adhesive agent coated thereon.

Figure 7:
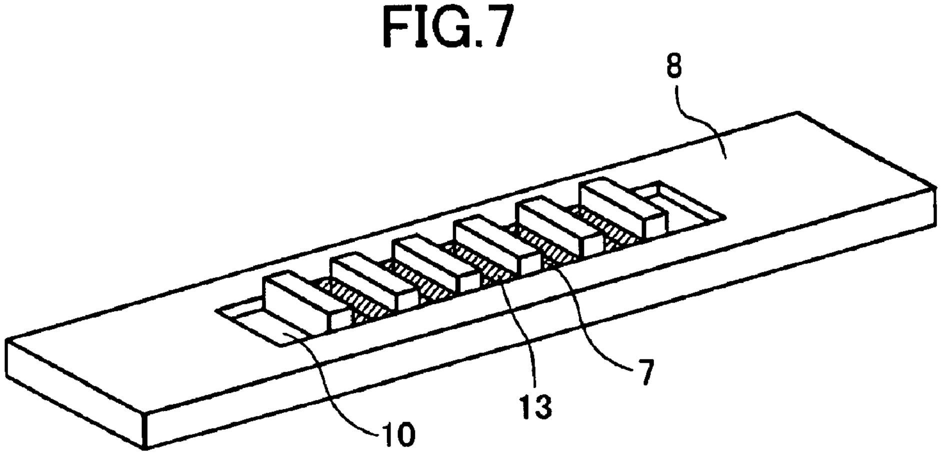
FIG. 7 a perspective view showing an adhesive agent applied to the dipping plate in FIG. 6.

Next, an actual bonding process will be described while referring to FIG. 7. As the adhesive agent, an epoxy resin is used that has a high viscosity at room temperature and that hardens at room temperature. As shown in FIG. 7, the adhesive agent 13 is poured into all the grooves 7 of the dipping plate 8 to an equal level. It should be noted that the dipping plate 8 must be held horizontally. If the dipping plate 8 is accidentally inclined, the adhesive agent 13 will flow out. The overly poured adhesive agent 13 is removed with the use of a tool, such as a wiper, so that the surfaces of the respective adhesive ponds are the same level.

Figure 8:
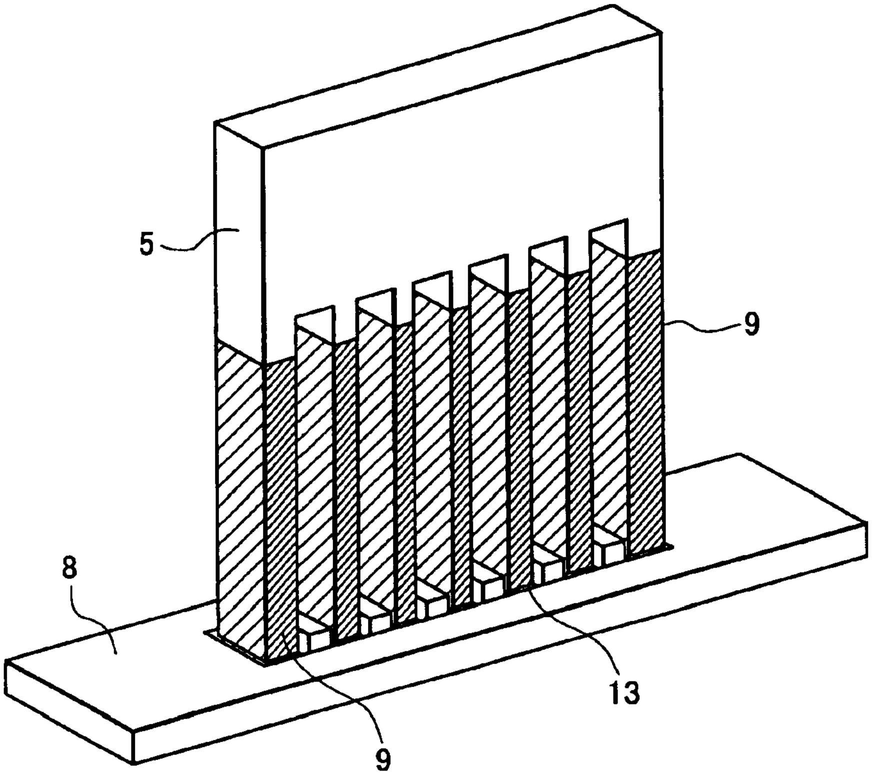
FIG. 8 is a perspective view showing a bonding condition of the oscillation unit to the dipping plate in FIG. 7.

The actuator unit 5 is attached to a positioning device (not shown) which moves the actuator unit 5 downward while maintaining it horizontally. The actuator unit 5 is brought into engagement with the dipping plate 8 with the aid of the positioning device. As shown in FIG. 8, the actuator unit 5 is fully engaged with the dipping plate 8 when the dummy actuators 9 are in abutment with the bottom surfaces of the grooves 10. In this condition, the space between the tip end of each actuator 1 and the bottom of the corresponding groove 7 is the same for all actuators 11 An imaginary first line that connects the tip ends of the respective actuators 1 is in parallel with an imaginary second line that connects the borders between immersed and non-immersed portions of the actuators 1. This means that an imaginary third line that connects the tip ends of the two dummy actuators 9 is in parallel with the second line mentioned above. The depth of the grooves 7 and 13 are so determined that the second line falls in an area of the inactive piezoelectric element at the tip end of the actuators 1. The duration of time the tip ends of the actuators 1 are immersed into the adhesive ponds is determined depending on the adhesive agent 13 to be used. For the adhesive agent that hardens at room temperature, the actuators 1 must be drawn quickly from the adhesive ponds.

When the actuators 1 are drawn from the adhesive ponds, the adhesive agent 13 clings in a uniform amount to the tip end portion of all the actuators 1. The tip ends of the actuators 1 with the adhesive agent clinging thereto are then brought into contact with and bonded to the corresponding projected portions 11 on the diaphragm 1 as shown in FIG. 2 using a positioning jig (not shown). When the tip ends of the dummy actuators 9 are brought into abutment with the diaphragm 1, the tip ends of the actuators 1 face the corresponding projected portions 11 with uniformly thick adhesive agent layers 5 intervened therebetween.

Figure 9:
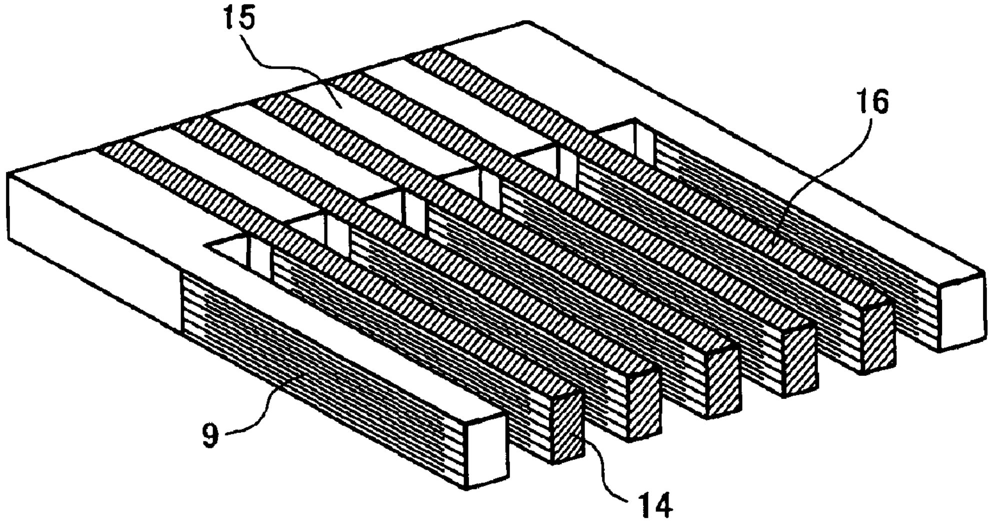
FIG. 9 is a perspective view showing an actuator unit according to another embodiment of the invention.
Figure 10:
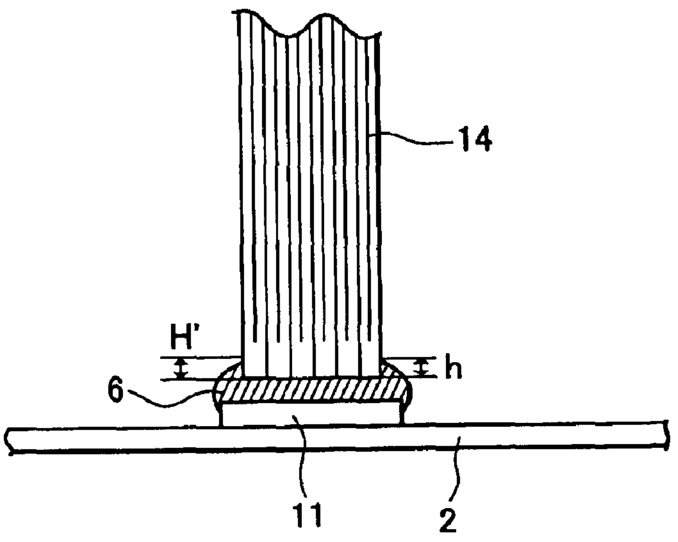
FIG. 10 is a partial cross-sectional plan view showing the actuator unit in FIG. 9.

The above-described embodiment employs a $d_{33}$ type piezoelectric actuator in which a plurality of piezoelectric elements are stacked in a direction in which the actuators extend from the base portion. As a modification, a $d_{31}$ type piezoelectric actuator may be used instead of the $d_{33}$ type actuator. An actuator unit 15 employing the $d_{31}$ type piezoelectric actuators 14 is shown in FIGS. 9 and 10. The actuator unit 15 has a plurality of actuators 14 extending from the base portion. Each actuator 14 deforms in the direction in which it extends from the base portion when applied with an electric signal, as is the case of the $d_{33}$ type actuator. Although not shown, the actuator unit 15 has two dummy actuators similar to the actuator unit 5 shown in FIG. 2.

Each actuator 14 is made up of a plurality of piezoelectric elements and internal electrodes alternately stacked in the thickness direction, i.e., the direction perpendicular to the direction in which the actuator 14 extends from the base portion. Every other internal electrode in each actuator 14 extends to the end face of the actuator 14 but do not extend to the base portion. The end face and the upper surface of the actuator 14 as shaded in FIG. 9 form an external common electrode. The external common electrode extends over the base portion to facilitate application of a ground potential, for example, to the common electrode. The remaining internal electrodes extend to the base portion but do not extend to the end face of the actuator 14. As such, the tip end portion of the actuator 14 where only a half of the internal electrodes extend is an inactive portion H' that does not deform in response to the electrical signal.

When immersing the tip ends of the actuators 14 into the adhesive ponds, the borders between immersed and non-immersed portions of the actuators 14 must be within a region of the inactive portions.

The manufacturing method of ink jet heads according to the present invention is advantageous in that variation in thickness of the adhesive agent coated on the actuators is reduced and the area on which the adhesive agent is coated is restricted. Accordingly, reliable bonding of the actuator unit to the diaphragm can be accomplished. Further, the use of dummy actuators simplifies positioning of the actuator unit relative to the dipping plate and the diaphragm. Accordingly, manufacturability of ink jet heads is improved. Furthermore, the actuators are not brought into contact with fixed articles during the manufacturing process and so are less likely to be damaged. Therefore, deflective ejection caused by damage to the actuators is reduced.

What is claimed is:

1. A method of manufacturing an ink jet head, comprising the steps of:

providing an actuator unit formed with a plurality of actuators extending in the same direction from abase portion to be in parallel with one another, each of said plurality of actuators being made of a plurality of piezoelectric elements extendable in a longitudinal direction causing tip ends of said plurality of actuators to move away from the base portion when an electrical signal is applied to the each of said plurality of actuators;

providing a diaphragm;

providing an ink channel unit formed with a plurality of ink channels corresponding to respective ones of said plurality of actuators individually;

dipping the tip ends of said plurality of actuators into an adhesive pond so that an adhesive agent clings to the tip ends of said plurality of actuators while maintaining a state in which an imaginary first line that connects the tip ends of said plurality of actuators is in parallel with an imaginary second line that connects borders between immersed and non-immersed portions of said plurality of actuators;

adhering said actuator unit onto one surface of said diaphragm while abutting the tip ends of said plurality of actuators against the one surface of said diaphragm; and attaching said ink channel unit to another surface of said diaphragm so that said plurality of ink channels are positioned in confronting relation with said respective ones of said plurality of actuators individually.

2. The method according to claim 1, wherein said actuator unit is further formed with at least two positioning members defining reference positions, and wherein the dipping step comprises bringing the imaginary second line to be substantially in coincidence with an imaginary third line that connects the reference positions when dipping the tip ends of said plurality of actuators into the adhesive pond.

3. The method according to claim 2, wherein said at least two positioning members extend from the base portion to be in parallel with said plurality of actuators.

4. The method according to claim 3, wherein said plurality of actuators are interposed between two of said at least two positioning members.

5. The method according to claim 1, wherein each of said plurality of actuators has an inactive portion at its tip end, said inactive portion being non-responsive to the electrical signal, and wherein the dipping step comprises bringing the imaginary second line to be within said inactive portion when dipping the tip ends of said plurality of actuators into the adhesive pond.

6. The method according to claim 1, wherein said actuator unit is further formed with at least two positioning members defining reference positions, and each of said plurality of actuators has an inactive portion at its tip end, said inactive portion being non-responsive to the electrical signal, and wherein the dipping step comprises bringing the imaginary second line to be substantially in coincidence with an imaginary third line that connects the reference positions and also to be within said inactive portion when dipping the tip ends of said plurality of actuators into the adhesive pond.

7. The method according to claim 1, wherein the dipping step comprises providing a dipping plate formed with a plurality of grooves corresponding to respective ones of said plurality of actuators, forming a plurality of adhesive ponds in said plurality of grooves by pouring an adhesive agent thereinto to be the same level, dipping the tip ends of said plurality of actuators into corresponding adhesive ponds, and drawing the tip ends of said plurality of actuators from the corresponding adhesive ponds.

* * * * *